Figure 1:
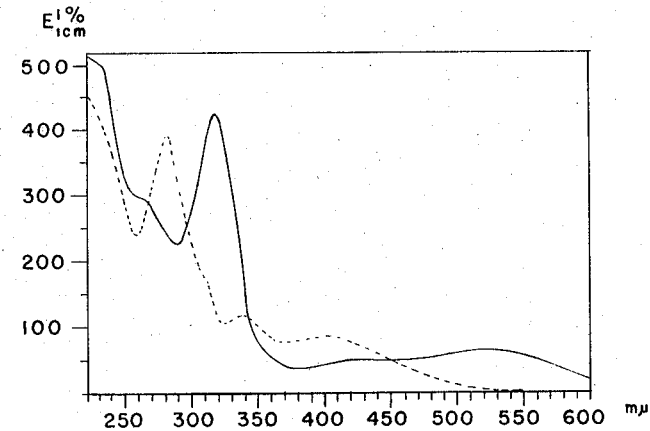

U.V. spectra of rifamycin S
——— in phosphate buffer pH 7.3
----- in 0.1 N HCl

I.R. spectrum of rifamycin S (form A)
(in nujol)

I.R. spectrum of rifamycin S (form B)
(in nujol)

INVENTORS
PIERO SENSI
MARIA TERESA TIMBAL

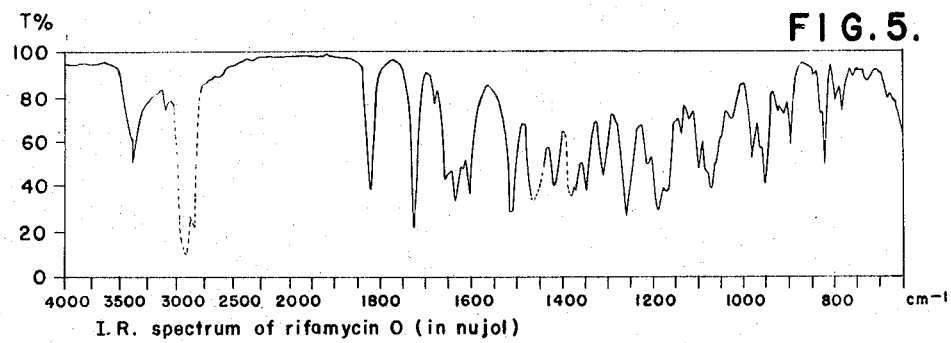
I.R. spectrum of rifamycin O (in nujol)
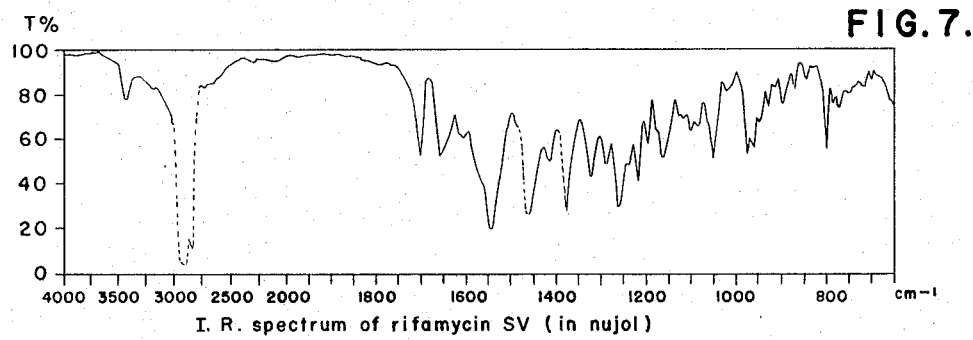
I.R. spectrum of rifamycin SV (in nujol)
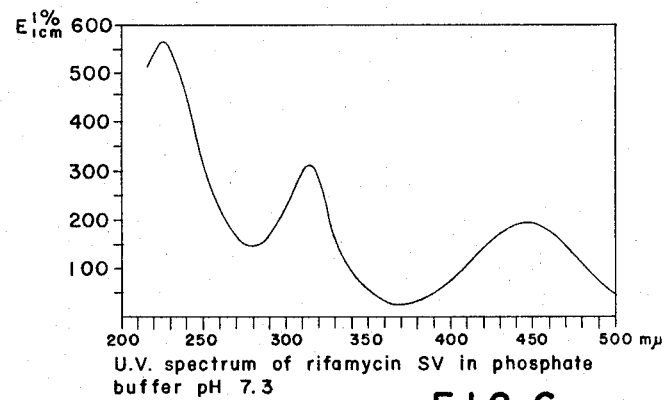
U.V. spectrum of rifamycin SV in phosphate buffer pH 7.3
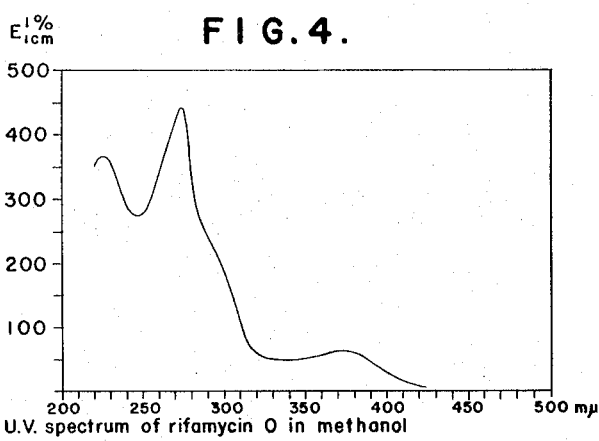
U.V. spectrum of rifamycin O in methanol
INVENTORS
PIERO SENSI
MARIA TERESA TIMBAL

United States Patent Office 3,301,753
Patented Jan. 31, 1967

3,301,753
ANTIBIOTIC
Piero Sensi and Maria Teresa Timbal, Milan, Italy,
assignors to Lepetit S.p.A., Milan, Italy
Filed July 19, 1960, Ser. No. 43,954
Claims priority, application Great Britain, Aug. 7, 1959,
27,144/59
13 Claims. (Cl. 167—65)

This invention is concerned with new antibiotic substances and a process for the production thereof.

In our copending applications Serial Nos. 830,619 and now abandoned, 12,654, now Patent No. 3,150,046, and 858,078 now Patent No. 2,988,490, we have described the production of the antibiotic rifamycin by fermentation of a strain of Streptomyces mediterranei. As stated in the above applications, rifamycin is a mixture of several substances having a high degree of antibiotic activity. One of these substances, which has been called rifamycin B, is the starting compound of the antibiotics which form the subject of the present application.

Although very stable for a long period of time when stored in the form of crystalline powder, rifamycin B tends to undergo some transformation when it is dissolved in water as such or in the form of its salts and stored in the presence of air. While it is known that several antibiotics, when dissolved or suspended in water, are rapidly inactivated giving decomposition products of no practical interest, it has been surprisingly found that rifamycin B undergoes a conversion into a new antibiotic substance which is far more active than rifamycin B itself, and which has been named by us rifamycin S. Although the mechanism of this step is not entirely understood, it is postulated that the conversion of rifamycin B into rifamycin S comprises an oxidative process caused by the presence of atmospheric oxygen.

Rifamycin S in turn, when submitted to a very mild reductive process, for instance by treatment with ascorbic acid, is converted to a further antibiotic substance also much more active than rifamycin B and which has been given the name of rifamycin SV.

By a modification of the procedure above described, the intermediate rifamycin S may be prepared by subjecting rifamycin B to the action of a class of oxidising agents, such as hydrogen peroxide or nitrous acid in a solvent which is usually a dilute lower aliphatic alcohol under strong acid conditions. Occasionally it has been noted that by carrying out this oxidation at about a neutral pH, a further antibiotic substance, called by us rifamycin O, is obtained, which when allowed to stand in the same solvent in which oxidation took place, undergoes, under the action of added mineral acids, a slow conversion into rifamycin S. This is then converted into rifamycin SV by mild reduction through the above described procedure.

One purpose of this invention is to provide the new highly active antibiotic substance, rifamycin SV. Another purpose is to describe processes by which said rifamycin SV is prepared through chemical transformations starting from the already known antibiotic rifamycin B. Further objects of the invention are the provision of the antibiotically active substances rifamycin S and rifamycin O, which are formed in the course of the conversion of rifamycin B into rifamycin SV. Still other objects of the invention will be apparent from the following description.

By one embodiment of the invention, rifamycin B is suspended in water, one equivalent amount of an alkali metal hydroxide is added and the mixture is allowed to stand for a period of 15–20 days at room temperature in the presence of atmospheric air. After acidification, the mixture is extracted with a lower alkyl acetate, the organic extract is evaporated to a small volume and poured into a large amount of petroleum ether. The precipitated crude rifamycin S is collected. The purification may be carried out by counter current partition using a mixture of phosphate buffer pH 7.6:butanol; ligroin 1:1:0.25 in a 200-tube Craig apparatus. After 170 transfers the maximum microbiological activity is about at the 160th tube. Alternatively, with a system petroleum ether:chloroform:methanol:water 25:15:25:5 the maximum after 194 transfers is about the 102nd tube.

Rifamycin S is an orange-yellow crystalline powder melting at 180–182°. $[\alpha]_D^{20} + 476°$ (c. 0.1, methanol). It is not soluble in water and in dilute mineral acids; it dissolves slowly in alkali metal hydroxides giving a red-violet colouration. It is fairly soluble in methanol, ethanol, acetone, ethyl acetate, less soluble in diethyl ether and very slightly soluble in petroleum ether. It gives positive Tollens, Fehling and ferric chloride reactions. In the U.V. and visible regions of the spectrum it shows the following maxima in 0.1 N HCl:

279 m$\mu$ ($E_{1cm}^{1\%}$ 329), 340 m$\mu$ ($E_{1cm}^{1\%}$ 117) and 401 m$\mu$ ($E_{1mm}^{1\%}$ 84).

Figure 2:
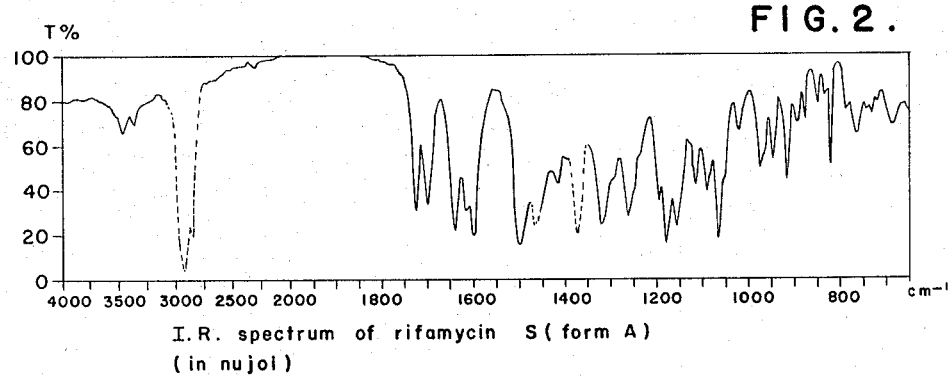

In phosphate buffer at pH 7.3 the maxima are at 317 m$\mu$ ($E_{1cm}^{1\%}$ 424) and 525 m$\mu$ ($E_{1cm}^{1\%}$ 62);

see FIGURE 1. By potentiometric assay it shows a single weak acidic group with pK about 7.1 (equivalent weight 685). Rifamycin S has the property of appearing in two different crystalline forms, however no definite rule has been discovered for selectively obtaining the one or the other form. The crystallization solvent, for instance, has no influence on the crystalline form. On samples obtained from methanol, the infrared spectrum of the one form, which we shall call "form A," shows the following maxima expressed in cm.$^{-1}$: 3480, 3365, 2925 (Nujol), 2850 (Nujol), 1728, 1702, 1643, 1622, 1600, 1500, 1467 (Nujol), 1418, 1377 (Nujol), 1325, 1265, 1200, 1183, 1160, 1118, 1095, 1070, 1024, 977, 948, 918, 895, 877, 850, 833, 822, 790, 765, 743, 732, 721, 685. The I.R. spectrum is illustrated in FIGURE 2.

Figure 3:
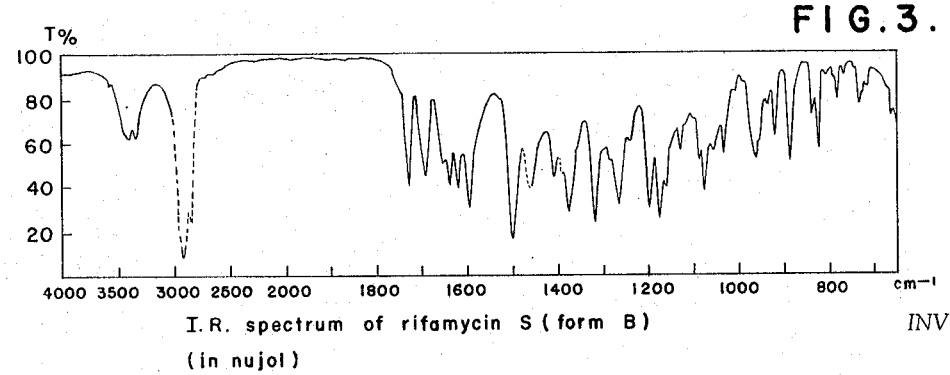

The I.R. spectrum of the other crystalline form of rifamycin S (form B) shows the following maxima expressed in cm.$^{-1}$: 3410, 3340, 2920 (Nujol), 2850 (Nujol), 1732, 1664, 1655, 1640, 1622, 1598, 1502, 1467 (Nujol), 1410, 1390, 1378 (Nujol), 1320, 1267, 1240, 1200, 1177, 1163, 1129, 1112, 1100, 1087, 1076, 1055, 1033, 1006, 987, 963, 935, 920, 886, 837, 825, 805, 789, 784, 765, 740, 735, 730, 718, 664. The I.R. spectrum of the second crystalline form of rifamycin S is reported in FIGURE 3.

An analysis of the compound gave: C, 63.34%; H, 6.79%; N, 2.18%; O, 27.80%; OCH$_3$, 4.50%; COCH$_3$, 6.10%. From this, the following approximate empirical formula could be elicited: $C_{37}H_{45-49}NO_{12}$.

By treatment with acetic anhydride in pyridine it gives a monoacetyl rifamycin S of M.P. 151–153° C.

The intermediate antibiotic substance rifamycin S may alternatively be prepared, as above stated, through the antibiotic substance rifamycin O. To this purpose, rifamycin B is dissolved in a mixture of a lower aliphatic alcohol and acetone and treated at about 0° with a water solution of an alkali metal nitrite. An aqueous 10 percent solution of HCl is then slowly added without overcoming 10°. At the end of the addition the solution containing rifamycin O is allowed to stand 8–9 hours at about 0–10° C., whereby rifamycin O is converted to rifamycin S.

If it is desired to isolate rifamycin O, the above reaction, or a similar oxidative reaction, may be carried out in the absence of solvents which are able to dissolve rifamycin O. In the above case, acetone can be omitted, whereby rifamycin O precipitates when the aqueous 10 percent solution of HCl is added to only slightly acidic pH. The crystals are collected and dried.

Rifamycin O is a light yellow crystalline powder which decomposes at 160° C. and does not melt below 300° C. $[\alpha]_D^{20}+71.5°$ (c. 1, dioxane). It is practically insoluble in water and dilute mineral acids, slowly soluble in alkali metal hydroxides with intense red-violet colouration. It is slightly soluble in methanol, ethanol, ethyl acetate and fairly soluble in acetone. Rifamycin O gives positive $FeCl_3$, Fehling and Tollens reactions. It has weak acidic character: on potentiometric assay in aqueous methanol it shows two weak acidic groups ($pK_11/2$, 7.7; $pK_21/2$, 10.75).

The U.V. spectrum of rifamycin O in methanol shows maxima at 226 m$\mu$ ($E_{1cm.}^{1\%}$ 365), 273 m$\mu$ ($E_{1cm.}^{1\%}$ 440) and 370 m$\mu$ ($E_{1cm.}^{1\%}$ 60)

see FIGURE 4.

The I.R. spectrum shows the following maxima expressed in cm.$^{-1}$; 3380, 3100, 2925 (Nujol), 2850 (Nujol), 1822, 1728, 1682, 1660, 1635, 1605, 1513, 1465 (Nujol), 1418, 1382 (Nujol), 1347, 1310, 1257, 1212, 1187, 1174, 1137, 1120, 1100, 1084, 1072, 1025, 980, 952, 925, 910, 896, 846, 820, 793, 783, 757, 725, 680. The I.R. spectrum is reported in FIGURE 5.

The maximum at 1822 cm.$^{-1}$ is very characteristic and its gradual disappearance can be taken as a measure of the conversion of rifamycin O into rifamycin S in the course of the above described reaction.

An analysis of the compound gave C, 62.53 percent; H, 6.46 percent; N, 1.74 percent; O, 29.37 percent; $OCH_3$, 4.23 percent; $COCH_3$, 5.59 percent. From this, the following approximate empirical formula could be elicited: $C_{39}H_{47-51}NO_{14}$.

By treatment with acetic anhydride in pyridine it gives a monoacetylrifamycin O of M.P. 203–205° C. When treated with ascorbic acid, rifamycin O gives rifamycin B in good yield.

As above stated, the last step of rifamycin SV preparation is the mild reduction of rifamycin S. This reduction is easily carried out by contacting a solution of rifamycin S with ascorbic acid. For example, to a solution of rifamycin S in a mixture of water and a lower aliphatic alcohol, a water solution of ascorbic acid is added. By a more direct procedure, the reaction mixture coming from the conversion of rifamycin B into rifamycin S through formation of rifamycin O, and consisting in an acidic solution of rifamycin S in a lower aliphatic alcohol-acetone-water mixture, can be directly treated with ascorbic acid, thus affording a very convenient preparation of rifamycin SV without isolation of the intermediate substances. In any case, rifamycin SV can be extracted with a solvent non-miscible with water, in which rifamycin SV is soluble, such as benzene, an alkyl acetate, a water insoluble aliphatic alcohol etc. On concentration in vacuo in a nitrogen stream of the extract pure rifamycin SV is obtained.

Rifamycin SV appears as brilliant, orange-yellow crystals which tend to darken when exposed to air and heating. It decomposes at about 140° and does not melt under 300°. $[\alpha]_D^{20}=-4°$ (c. 1.0, methanol). It is a fairly strong monobasic acid (pH 1/2, 2.7), which easily dissolves in alkali bicarbonates and is very slightly soluble in dilute mineral acids. It is very soluble in methanol, ethanol, acetone, ethtyl acetate: soluble in diethyl ether and slightly soluble in petroleum ether. Rifamycin SV gives positive $FeCl_3$, Tollens and Fehling reactions. In the U.V. and visible regions of the spectrum it shows the following maxima in phosphate buffer at pH 7.3:

223 m$\mu$ ($E_{1cm.}^{1\%}=565$), 314 m$\mu$ ($E_{1cm.}^{1\%}=309$) and 445 m$\mu$ ($E_{1cm.}^{1\%}=188$)

see FIGURE 6. The I.R. spectrum shows the following maxima expressed in cm.$^{-1}$: 3440, 2925 (Nujol), 2845 (Nujol), 1700, 1658, 1605, 1545, 1463 (Nujol), 1415, 1376 (Nujol), 1325, 1290, 1260, 1218, 1197, 1164, 1125, 1115, 1102, 1083, 1050, 1020, 776, 962, 960, 930, 915, 898, 871, 845, 830, 801, 785, 772, 760, 750, 717, 703. The I.R. spectrum is reported in FIGURE 7.

An analysis of the pure compound gave C, 62.85 percent; H, 7.15 percent; N, 2.08 percent; $OCH_3$, 4.4 percent; $COCH_3$, 6.15 percent. From this the following empirical formula could be elicited: $C_{37}H_{47-51}NO_{12}$.

By treatment with acetic anhydride and pyridine rifamycin SV gives a triacetylderivate of M.P. 234–236° C.

With alkali and earth alkali metal bases rifamycin SV gives neutral salts. Stable salts are formed also with organic bases, such as dibenzylamine, dibenzylethylenediamine, quinine, 2-methylaminoheptane, 1-p-chlorobenzyl-2-pyrrolidylmethyl-benzoimidazole, piperidine, piperazine, procaine, etc.

The exceptionally high antibacterial activity of rifamycin SV is shown by the following table, which gives the minimum inhibitory concentration in $\gamma$/ml. against a series of pathogenic microorganisms.

TABLE I

Microorganism:
| | |
|---|---|
| M. pyogenes var. aureus ATCC 6538 | 0.0025 |
| M. pyogenes var. aureus ATCC 13301 | 0.005 |
| M. pyogenes var. aureus ATCC 9144 | 0.0025 |
| M. pyogenes var. albus ATCC 12228 | 0.0025 |
| S. pyogenes var. aureus grey Weinstein | 0.0025 |
| S. faecalis ATCC 10541 | 0.025 |
| S. faecalis ATCC 7830 | 0.5 |
| S. haemolyticus C 203 | 0.001 |
| S. mastitidis ATCC 7077 | 0.025 |
| S. bovis ATCC 9809 | 0.01 |
| Neisseria catharralis ATCC 8176 | 0.01 |
| Neisseria gonorrhoeae ATCC 9826 | 0.01 |
| Diplococcus pneumoniae XXXVII L | 0.0025 |
| Sarcina lutea ATCC 9341 | 0.01 |
| Sarcina subflava ATCC 7468 | 0.01 |
| M. flavus ATCC 10240 | 0.005 |
| B. subtilis ATCC 6633 | 0.025 |
| B. cereus ATCC 10876 | 0.25 |
| B. anthracis | 0.05 |
| Clostridium perfrigens ATCC 3226 | 0.025 |
| Klebsiella pneumoniae ATCC 10031 | 25 |
| Klebsiella pneumoniae capsulata | 100 |
| Escherichia coli McLeod ATCC 10536 | 50 |
| Pseudomonas aeruginosa Gottlieb | 50 |
| Pseudomonas fluorescens ATCC 11251 | 25 |
| Proteus vulgaris X 19 H ATCC 881 | 50 |
| Proteus morganii ATCC 9237 | 50 |
| Proteus rettgeri ATCC 9919 | 50 |
| Shigella sonnei ATCC 9290 | 200 |
| Shigella dysenteriae ATCC 9583 | 50 |
| Salmonella typhi | 150 |
| Salmonella paratyphi ATCC 9150 | 200 |
| Salmonella schottmuellerii ATCC 9149 | 200 |
| Brucella abortus | 5 |
| Brucella melitensis ATCC 4309 | 2.5 |
| Pasteurella pestis ATCC 87 NIH | 10 |
| Mycobacterium ranae | 2 |
| Mycobacterium phlei ATCC 10142 | 0.01 |
| Mycobacterium minetti | 5 |
| Mycobacterium sp. 607 | 5 |
| Nocardia asteroides | 50 |
| Mycobacterium tubercolosis var. hominis H 37 Rv ATCC 9360 | 0.05 |
| Candida albicans ATCC 10231 | 200 |
| Trichophyton mantagrophytes ATCC 8757 | 200 |

The following examples are illustrative of the invention.

EXAMPLE 1

A suspension of 10 g. of rifamycin B in water (10 l.) is treated with a stoichiometric amount of sodium hydroxide, whereby a solution of the monosodium salt of rifamycin B with pH 4.1 is obtained. After 20 days at room temperature the solution is adjusted to pH 2.2 by the addition of hydrochloric acid and extracted with ethyl acetate. The extract is evaporated to about 50 ml. Unaltered crystallised rifamycin B is filtered off and the filtrate is poured into about 2 litres of petroleum ether. The crude precipitate is collected and purified by countercurrent partition in a 200-tube Craig apparatus using a mixture phosphate buffer pH 7.6: butanol:ligroin 1:1:0.25. After 170 transfers the highest activity is found near the 160th tube. The solvent from the 155th to the 165th tube is evaporated to dryness giving crude rifamycin S.

EXAMPLE 2

To a solution of 10 g. of rifamycin B in 2000 ml. of methanol, 3000 ml. of water are added, followed by 100 ml. of an about 40% solution of hydrogen peroxide in water. After warming at 45–50° C. for 30 minutes the mixture is cooled to 0° C. The precipitated crystals are collected and dried at 40° in vacuo. Yield 6.5 g. of rifamycin O.

EXAMPLE 3

To a solution of 10 g. of rifamycin B in 1000 ml. of methanol a solution of 50 g. of sodium nitrite in 250 ml. of water is added, followed by the stoichiometric amount of 10% hydrochloric acid to slightly acidic reaction (pH about 4.0). Rifamycin O precipitates in the course of the acid addition. After cooling to 0° C., the precipitate is collected and dried. Yield 9 g. of rifamycin O. On crystallisation from methanol 8.5 g. of pure rifamycin O are obtained.

EXAMPLE 4

A methanol solution containing about 1000 γ/ml. of rifamycin O is diluted with 10 volumes of water and adjusted to pH 3. After four days at room temperature most of the methanol is distilled off in high vacuo at 25° and the residual mixture is extracted with ethyl acetate. The solvent is concentrated in vacuo to a small volume and poured into petroleum ether. By countercurrent partition with a mixture petroleum ether-chloroform-methanol-water 25:15:25:5 after 194 transfers the maximum is found at the 102nd tube. The tubes from the 85th to the 115th are distilled in high vacuo to a small volume. The acqueous residue is extracted with ethyl acetate which on concentration to dryness gives crude rifamycin S.

EXAMPLE 5

To a solution of 10 g. of rifamycin B in a mixture of 1000 ml. of methanol and 2000 ml. of acetone a solution of 50 g. of sodium nitrite in 500 ml. of water is added at 0° C. Gradually and with external cooling 2500 ml. of 10% acqueous hydrochloric acid are poured in causing formation of rifamycin O which is maintained in solution by the presence of acetone. Owing to the strong acidity of the medium rifamycin O gradually is transformed into rifamycin S; the conversion is complete in about 8 hours at a temperature of 0 to 5° C. The reaction mixture is poured into a large amount of water and extracted with ethyl acetate. The extract is thoroughly washed with water, concentrated in vacuo to a volume of about 50 ml. and poured into about 500 ml. of petroleum ether. Rifamycin S is collected and crystallised from methanol. Yield 6.5 g.

EXAMPLE 6

To a solution of 10 g. of rifamycin S in 500 ml. of ethanol a solution of 10 g. of ascorbic acid in 60 ml. of water is added. After 10 minutes 3000 ml. of water are added and the mixture is extracted with benzene. On concentration of the benzene extract rifamycin SV crystallises out and is collected and recrystallised from benzene.

EXAMPLE 7

A solution of 10 g. of rifamycin SV in 200 ml. of water is treated with a stoichiometric amount of a 10% solution of sodium hydroxide in the presence of a small amount of sodium ascorbate which prevents the oxidation of rifamycin SV to rifamycin S. By the addition of 20 g. of monosodium phosphate the sodium salt of rifamycin SV precipitates. Yield 9.0 g. It is soluble in water in a ratio 1:40 w./w., and is very stable in water solution at neutral pH, particularly in the presence of sodium ascorbate.

EXAMPLE 8

To a solution of rifamycin B (10 g.) in a mixture of 1000 ml. of methanol and 2000 ml. of acetone a solution of 50 g. of sodium nitrite in 500 ml. of water is added at 0° C., followed by 2500 ml. of 10% acqueous hydrochloric acid added gradually and with external cooling. At the end of the acid addition the mixture is allowed to stand 8 hours at 0 to 5° C., then 30 g. of ascorbic acid are added. After 10 minutes the mixture is poured into 5000 ml. of water and extracted with benzene. On concentration of the solvent rifamycin SV crystallises in pure form.

EXAMPLE 9

Ten grams of rifamycin B are treated as described in Example 8, except that at the end of the acid addition, and after the mixture has been allowed to stand 8 hours at 0 to 5° C., it is poured into 30 litres of a water solution buffered at pH 7.0 and containing 20 g. of sodium ascorbate. Simultaneously sodium hydroxide is added in order to keep the neutral pH. The sodium salt of rifamycin SV is thus formed in the solution. After acidification rifamycin SV is extracted with benzene and the extract is evaporated to a small volume whereby pure rifamycin SV crystallises.

We claim:

1. The antibacterial substance defined as rifamycin S, melting at 180–182° C., having $[\alpha]_D^{20}$ about +476° (c. 0.1, methanol), being insoluble in water and dilute mineral acids, slowly dissolving in alkali metal hydroxides with red-violet coloration, being fairly soluble in methanol, ethanol acetone, ethyl acetate, less soluble in diethyl ether and very slightly soluble in petroleum ether, giving positive Tollens, Fehling and $FeCl_3$ reactions, showing in the ultra violet and visible regions of the spectrum the following maxima in 0.1 N HCl:

279 mµ ($E_{1cm.}^{1\%}$ 329), 340 mµ ($E_{1cm.}^{1\%}$ 117) and 401 mµ ($E_{1cm.}^{1\%}$ 84)

and the following maxima in phosphate buffer pH 7.3: 317 mµ ($E_{1cm.}^{1\%}$ 424) and 525 mµ ($E_{1cm.}^{1\%}$ 62)

being acidic in nature with pK about 7.1, appearing in two different crystalline forms, of which the one shows in the infra red region of the spectrum, the following maxima expressed in cm.$^{-1}$: 3480, 3365, 2925 (Nujol), 2850 (Nujol), 1728, 1702, 1643, 1622, 1600, 1500, 1467 (Nujol), 1418, 1377 (Nujol), 1325, 1265, 1200, 1183, 1160, 1118, 1095, 1070, 1024, 977, 948, 918, 895, 877, 850, 833, 822, 790, 765, 743, 732, 721, 685, and the other: 3410, 3340, 2920 (Nujol), 2850 (Nujol), 1732, 1664, 1655, 1640, 1622, 1598, 1502, 1467 (Nujol), 1410, 1390, 1378 (Nujol), 1320, 1267, 1240, 1200, 1177, 1163, 1129, 1112, 1100, 1087, 1076, 1055, 1033, 1006, 987, 963, 935, 920, 886, 837, 825, 805, 789, 784, 765, 740, 735, 730, 718, 664, and yielding the following chemical analysis: C, 63.34%; H, 6.79%; N, 2.18%; O, 27.80%; $OCH_3$, 4.50%, and $COCH_3$, 6.10%.

2. The antibacterial substance defined as rifamycin O, decomposing at 160° C. and not melting below 300° C., having $[\alpha]_D^{20}$ about +71.5° (c. 1, dioxane), being insoluble in water and dilute mineral acids, slowly soluble in alkali metal hydroxides with intense red-violet coloration, being slightly soluble in methanol, ethanol, ethyl acetate, fairly soluble in acetone, giving positive Tollens, Fehling and $FeCl_3$ reactions, being acidic in nature with $pK_1$ 1/2, 7.7 and $pK_2$ 1/2, 10.75, showing in the ultra violet region of the spectrum maxima at 226 m$\mu$ ($E_{1cm}^{1\%}$ 365), 273 m$\mu$ ($E_{1cm}^{1\%}$ 440) and 370 m$\mu$ ($E_{1cm}^{1\%}$ 60)

showing in the infra red region of the spectrum the following maxima expressed in cm.$^{-1}$: 3380, 3100, 2925 (Nujol), 2850 (Nujol), 1822, 1728, 1682, 1660, 1635, 1605, 1513, 1465 (Nujol), 1418, 1382 (Nujol), 1347, 1310, 1257, 1212, 1187, 1174, 1137, 1120, 1100, 1084, 1072, 1025, 980, 952, 925, 910, 896, 846, 820, 793, 783, 757, 725, 680, and giving the following chemical analysis: C, 62.53%; H, 6.46%; N, 1.74%; O, 29.37%; $OCH_3$, 4.23%; $COCH_3$, 5.59%.

3. A compound of the class consisting of the antibacterial substance defined as rifamycin SV, decomposing at about 140° C. and not melting below 300° C., having $[\alpha]_D^{20}$ about —4° (c. 1.5, dioxane), being acidic in nature with pK 1/2 2.7, being soluble in alkali metal bicarbonates, very slightly soluble in dilute mineral acids, very soluble in methanol, ethanol, acetone, ethyl acetate, soluble in diethyl ether, slightly soluble in petroleum ether, giving positive Tollens, Fehling and $FeCl_3$ reactions, showing in the ultra violet and visible regions of the spectrum in phosphate buffer pH 7.3 absorption maxima at 313 m$\mu$ ($E_{1cm}^{1\%}$ 285) and 445 m$\mu$ ($E_{1cm}^{1\%}$ 173)

showing in the infra red region of the spectrum the following absorption bands expressed in cm.$^{-1}$: 3440, 2925 (Nujol), 2845 (Nujol), 1700, 1658, 1605, 1545, 1463 (Nujol), 1415, 1376 (Nujol), 1325, 1290, 1260, 1218, 1197, 1164, 1125, 1115, 1102, 1083, 1050, 1020, 776, 962, 960, 930, 915, 898, 871, 845, 830, 801, 785, 772, 760, 750, 717, 703, and having substantially the following percentage compositions: C, 62.85%; H, 7.15%; N, 2.08%; $OCH_3$, 4.4%, and $COCH_3$, 6.15%, its non-toxic organic base addition salts and alkali and alkaline earth metal salts.

4. A process for preparing the compound of claim 1, which comprises admixing a compound of the class consisting of rifamycin B and its alkali metal salts with water and allowing the mixture to stand for 15–20 days in the presence of atmospheric oxygen.

5. A process for preparing the compound of claim 2 which comprises dissolving rifamycin B in a water-methanol mixture and adding to the solution an oxidizing agent of the class consisting of hydrogen peroxide and nitrous acid.

6. A process for preparing the compound of claim 1, which comprises admixing a solution of rifamycin B in a methanol-acetone mixture with a water solution of sodium nitrite, adding hydrochloric acid to acidic reaction and allowing the mixture to stand at 0–5° C. for about 8 hours.

7. A process for preparing the compound of claim 3, which comprises admixing a solution of rifamycin S in a lower aliphatic alcohol with a water solution of ascorbic acid and allowing the solution to stand for about ten minutes at a temperature between 0° C. and the room temperature.

8. A process for preparing the antibiotic substance defined as rifamycin SV, which comprises admixing a solution of rifamycin B in a methanol acetone mixture with a water solution of sodium nitrite at 0° C., adding hydrochloric acid to acidic reaction, allowing the mixture to stand for about 8 hours at 0 to 5° C., adding ascorbic acid to the mixture, allowing the mixture to stand for about 10 minutes at a temperature between 0° C. and the room temperature and extracting the solution with benzene.

9. A process for preparing the sodium salt of the antibiotic substance defined as rifamycin SV, which comprises admixing a solution of rifamycin B in a methanol-acetone mixture with a water solution of sodium nitrite at 0° C., adding hydrochloric acid to acidic reaction, allowing the mixture to stand for about 8 hours at 0 to 5° C., adjusting the pH of the solution to pH 7.0, and adding sodium ascorbate to the solution.

10. R rifamycin antibiotic of the group consisting of rifamycin S, rifamycin O, and rifamycin SV and its non-toxic organic base addition salts.

11. A process for preparing the antibiotic substance defined as rifamycin SV which comprises subjecting a solution of rifamycin B to the action of a mild oxidizing agent of the class consisting of sodium nitrite and hydrogen peroxide, adding to the mixture, without isolating rifamycin O so obtained, hydrochloric acid to acidic reaction, allowing the mixture to stand for about 8 hours at 0° to 5° C., adding ascorbic acid to the mixture without isolating the intermediate rifamycin S, allowing the mixture to stand for about 10 minutes at a temperature between 0° C. and room temperature, and extracting the solution with benzene.

12. A member selected from the class consisting of the alkali and alkaline earth metal salts of the antibiotic rifamycin SV defined in claim 3.

13. The sodium salt of the antibiotic rifamycin SV defined in claim 3.

References Cited by the Examiner

UNITED STATES PATENTS 2,482,055  9/1949  Duggar _____ 167—65
2,999,048  9/1961  Donovick et al. _____ 167—65

OTHER REFERENCES

Antibiotics, edited by Irving & Herrick, 1949, Chemical Publ. Co., p. 5.

Sensi et al., Antibiotics Annual 1959–60, pp. 262–292, pub. by Antibiotica Inc., N.Y.C., papers on these articles by Sensi et al., presented Nov. 4–6, 1959.

Experentia, vol. XVI, No. 9, 1960, pp. 412–414.

The Pfizer Handbook of Microbial Metabolites (1961), p. 272.

Sensi et al., Il Farmaco, Sci. Ed., February 1959, pp. 146–147.

Il Farmaco, Sci. Ed., pp. 228–234, March 1960.

Il Farmaco, Sci. Ed., March 1961, pp. 165–180.

JULIAN S. LEVITT, *Primary Examiner.*

MORRIS O. WOLK, LEWIS GOTTS, FRANK CACCIAPAGLIA, JR., *Examiners.*

D. LEVY, *Assistant Examiner.*